May 29, 1934.                H. B. ROCK                1,960,714
                             WATER COOLER
                          Filed April 19, 1932

Inventor
Harry B. Rock by  *J. N. Adams*
    Attorney

Patented May 29, 1934

1,960,714

UNITED STATES PATENT OFFICE 1,960,714

WATER COOLER

Harry B. Rock, Los Angeles, Calif., assignor to California Consolidated Water Company, Los Angeles, Calif., a corporation of Delaware Application April 19, 1932, Serial No. 606,105

3 Claims. (Cl. 62—91)

This invention relates to water coolers and dispensers, and particularly to that type of dispenser in which the contents are cooled by evaporation from the outer surface of a receptacle.

Water coolers are widely used in some portions of the country for dispensing water from replaceable storage containers or bottles, which are usually of five gallon capacity and are filled with water of higher quality than is available from the regular piped supply.

A popular type of water cooler commonly used comprises a container of burned, unglazed clay of a porous or pervious character into which water from the storage bottle is discharged by gravity. Due to the porous nature of this unglazed clay container, a portion of the drinking water seeps therethrough and evaporates from the outer surface, thereby tending to cool the container and the water within it. A faucet is usually provided in the lower portion of the container for drawing off the water as it may be required.

This type of cooler is open to a number of disadvantages which have been overcome by a construction in which the porous container has been replaced by an impervious container of metal, glass or ceramic ware. A tubular porous sleeve surrounds the container and dips into the conventional water drip pan at its lower end. Water from the drip pan, which may be unconsumed water drawn from the cooler or which may be common tap water from the piped supply, rises through the porous sleeve around the container and maintains it in a wetted condition. Evaporation then takes place from this wetted sleeve, thereby cooling the container and the water therein.

An improved construction for a cooler of this type constitutes an annular sleeve or shield, usually of metal, which surrounds the container and the porous sleeve and is spaced a short distance therefrom. This shield prevents absorption of radiant heat by the sleeve from surrounding objects and also induces convection currents in the air surrounding the sleeve, removing the air as it becomes saturated and bringing in a fresh supply to assist the evaporation of water from the wetted sleeve.

It has been found that this construction, employing a porous sleeve fed by capillarity from a pan of water into which it dips, oftentimes does not raise sufficient water to the upper part of the sleeve, which becomes dry and does not function as a cooling agent. This invention is intended to obviate that difficulty by providing a construction at the upper end of said container and sleeve whereby waste water from that drawn from the cooler or supplementary water from another source may be added to the upper end of the porous sleeve surrounding the cooling chamber.

It is an object of this invention to provide an improved form of water cooler in which water for evaporation may be supplied to the upper portion of a porous sleeve surrounding a cooling chamber.

Another object is to provide a cover or lid for a shield which may surround the coling chamber of a water cooler, said lid being adapted to form a distributor and reservoir of supplementary cooling water for the upper end of said cooling container.

Yet another object of this invention is to provide a distributor adapted to supply water to the upper end of a water cooler which employs a porous sleeve surrounding an impervious cooling chamber, said distributor being adapted to slowly and uniformly feed water to said porous sleeve.

Another object of this invention is to provide an improved form of water cooler which is adapted to maintain its efficiency at high rates of evaporation from its wetted surface.

These and other objects and advantages of this invention will become apparent from the following detailed description of preferred embodiments of the invention and their manner of operation, it being understood that the invention is not limited to the arrangements specifically described.

In describing the invention reference will be made to the accompanying drawing which forms a part of this specification.

In the drawing Figure 1 is a vertical sectional view of a water cooler contructed according to this invention.

Figure 1:
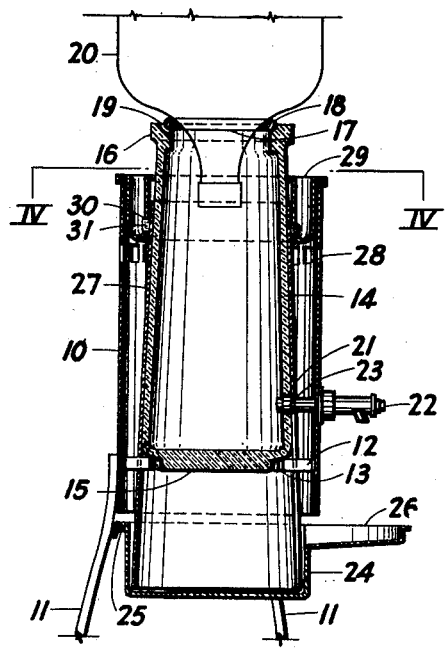
Figure 3:
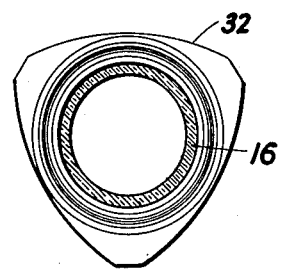
Figure 3 is a plan view on line III—III of Figure 2.
Figure 4:
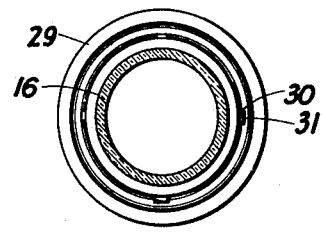
Figure 4 is a plan view on line IV—IV of Figure 1.

Referring to Figure 1, the numeral 10 represents a cylindrical guard or shield, supported by the vertical legs 11 of a conventional water cooler. This shield is provided with an internal spider 12 adjacent its lower end, which spider contains an annular ring 13 concentric with the shield 10. A glass or ceramic ware container 14 is supported from the spider 12 and may be fitted with a downwardly extending centering projection or boss 15 which is received in the ring 13.

At the upper end of container 14, which is preferably substantially cylindrical in form, is a rim 16 which is provided with a recess 17 as indicated to receive an annular rubber gasket 18. Suitable vent passages 19 are provided in the recess 17 to allow the passage of air therethrough to replace the water drawn from the storage bottle, in the well-known manner. Resting upon gasket 18 is the conventional inverted water supply bottle, 20, as shown.

In the side of container 14, near its lower end, is provided an outlet 21 in which is mounted the conventional faucet 22, which projects through a corresponding opening in the shield 10 previously mentioned. A suitable adapter 23 may be used to make a tight joint between the sleeve of the faucet and the opening in container 14.

A drip pan and cooling water container 24 is supported from suitable brackets 25 beneath the bottom of shield 10 and is preferably adapted to be removed for cleaning or emptying. Pan 24 is provided with a catch basin or extension 26 immediately below the faucet 22 to act as an overflow or drip receptacle.

Surrounding the cooling container 14 is a porous sleeve 27 which may be of blotting paper or a knitted or woven fibrous fabric. This sleeve extends from a point near the top of container 14 downwardly into the bottom of pan 24. Where it passes over the sleeve of faucet 22 and the arms of spider 12 it is slotted as may be required for installation or removal.

The function of sleeve 27 is to draw by capillarity the water from pan 24 upward to its very top, thus providing a wetted surface around container 14, from which surface evaporation will take place under the influence of convection currents set up by shield 10, which is preferably perforated or slotted near its upper end as indicated by numeral 28. It has been found, however, that under certain very hot weather conditions the upper end of sleeve 27 may become dry, thus interfering with the cooling function of the sleeve and reducing the efficiency of the entire cooler.

In order to supply moisture to the upper end of sleeve 27 an annular trough-shaped cover 29 is fitted to the top of shield 10 as indicated. Member 29 is preferably flanged at its outer edge to rest upon the top of shield 10 and is of such internal diameter that it loosely surrounds container 14 but does not actually touch it. Spaced around the lower inside surface of the trough formed by member 29 are a series of openings 30 which may be filled with porous plugs 31 of felt or other absorbent material. These are preferably loosely held in the openings 30 and are in light contact with the upper end of sleeve 27.

In operation, waste water from the faucet 22 or supplementary water from another source is occasionally poured into the annular trough-shaped member 29, whereupon it seeps through the plugs 31 and is distributed uniformly and slowly to the upper end of sleeve 27, thereby maintaining it in a wetted condition over its entire area. This has been found to supplement the water lifted by capillary attraction from the pan 24 and helps to maintain the container 14 in its coolest possible condition.

Figure 2:
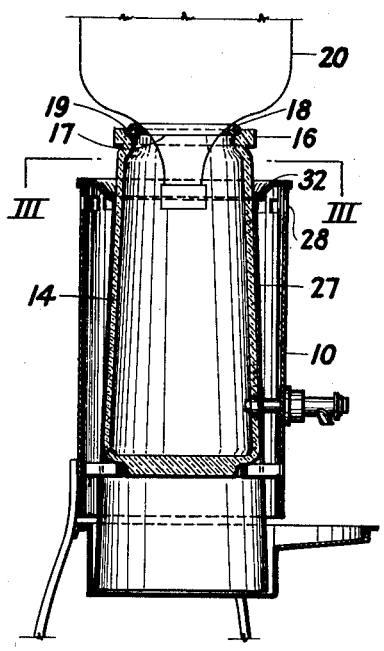
Figure 2 is a vertical section of an alternative and more simple form of the invention.

Referring now to Figure 2, which shows a modification of the annular trough 29, it will be seen that said trough may be replaced by a simple annular cover 32 which is flanged at its outer edge to rest over shield 10, which is illustrated as being of a modified cylindrical shape, and loosely surround the container 14 near or above the top of the porous sleeve 27. In this embodiment the inner edge of the cover adjacent the container 14 is depressed to direct cooling water poured on the cover against the upper portion of the porous sleeve 27. Its operation would not be so satisfactory as the preferred embodiment previously described due to the lack of uniform and slow distribution of water to the porous sleeve, but it would afford a simple and economical means of intermittently supplying cooling water to the top of sleeve 27.

It will be recognized that this invention may equally well be adapted to the older types of cooler mentioned above, namely, the porous jar type, the cover forming a supplementary source of water for wetting the external surface of the jar or olla. Under certain conditions, as in the case of a jar whose internal surface were made impermeable as by being glazed, the outer surface being left porous, this invention could form the only source of evaporative water to the jar surface.

It will also be recognized that the annular cover and cylindrical shield, here shown separate, could be made in one piece or could be joined by welding, brazing or the like. In this case, it could be designated by the single term "shield" or some equivalent expression.

Although specific constructions embodying this invention have been described and illustrated, it is to be understood that the invention is not limited to those specific arrangements, and all such modifications and changes as come within the scope of the appended claims are embraced thereby.

I claim:

1. In a water cooler, a reservoir, a porous sleeve surrounding said reservoir and extending to the top thereof, a shield surrounding said reservoir and spaced therefrom, a cover for said shield and water receiving means in said cover in communication with said sleeve.

2. A water cooler comprising a reservoir of water-tight material, a casing of water absorbent material surrounding said reservoir and in contact with the outer surface thereof, a separate reservoir positioned below said first reservoir, said casing of water absorbent material extending into said second reservoir, a shield surrounding and spaced from said casing, a cover for said shield, and water receiving means in said cover in communication with said casing.

3. In a water cooler including a reservoir with an absorbent external surface and a shield surrounding said reservoir and spaced therefrom, a cover for said shield, and water receiving means in said cover in communication with the absorbent external surface of said reservoir.

HARRY B. ROCK.